United States Patent [19]
McKenry

[11] Patent Number: 5,421,514
[45] Date of Patent: Jun. 6, 1995

[54] PRE-PLANT SOIL TREATMENT METHOD AND APPARATUS

[76] Inventor: Michael V. McKenry, 1888 E. Lester, Fresno, Calif. 93720

[21] Appl. No.: 159,684

[22] Filed: Nov. 29, 1993

[51] Int. Cl.⁶ .................................................. B05B 7/26
[52] U.S. Cl. ...................... 239/10; 239/728; 239/734; 239/70
[58] Field of Search ............... 236/728, 734, 735, 743, 236/10, 69; 43/134.1, 124; 47/1 F, 48.5 L; 239/542, 70

[56] References Cited

U.S. PATENT DOCUMENTS

| | | | |
|---|---|---|---|
| 3,888,418 | 6/1975 | Seith et al. | 239/542 X |
| 3,910,500 | 10/1975 | Hardison | 239/542 X |
| 4,299,841 | 11/1981 | Geering | 424/282 |
| 4,771,947 | 9/1988 | Smeller et al. | 239/542 X |
| 4,917,304 | 4/1990 | Mazzei et al. | 239/69 X |
| 5,007,197 | 4/1991 | Barbett | 43/124 |

OTHER PUBLICATIONS

Principles and Practice of Nematode Control in Crops Brown & Kerry.
Annual Review of Phytopathology Grogan, Zentmyer & Cowling.
Vistas on Nematology: A Commemoration of the Twenty-Fifth Anniversary of the Society of Nematologists. Veech & Dickson.

Primary Examiner—Andres Kashnikow
Assistant Examiner—Kevin P. Weldon
Attorney, Agent, or Firm—Mark D. Miller

[57] ABSTRACT

A portable soil drenching apparatus and method employing any of a number of water soluble biocidal materials for pre-plant soil treatment in order to eliminate pests and disease agents. The apparatus includes a series of hoses each having drip irrigation emitters in place thereon at spaced intervals. The hoses may be attached to the underside of a tarp. Each hose is sealed at one end and attached at the other end to a manifold delivery system. The hoses are deployed onto the field which is to be treated, and the manifold is connected to a water supply and material mixing source. The selected materials are mixed with the water and introduced into the hose and manifold system by one of three alternative methods (uniform delivery, wave delivery or stacking) resulting in drenching of the field and elimination of pests and/or disease agents. Alternative embodiments allow for connection to existing linear, wheel line, and center-pivot irrigation systems and for the use of low atomizing sprinklers instead of hoses.

4 Claims, 12 Drawing Sheets

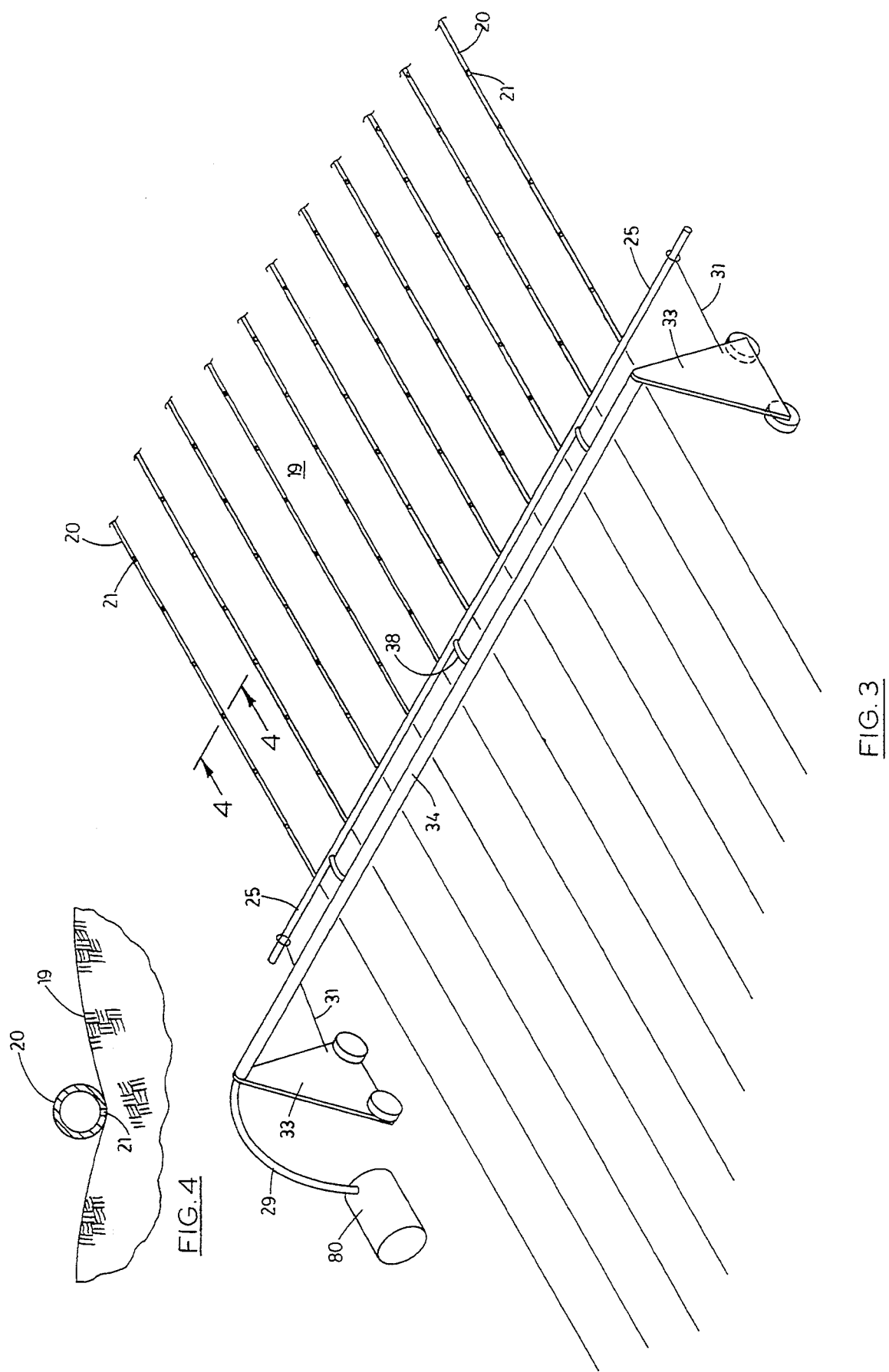

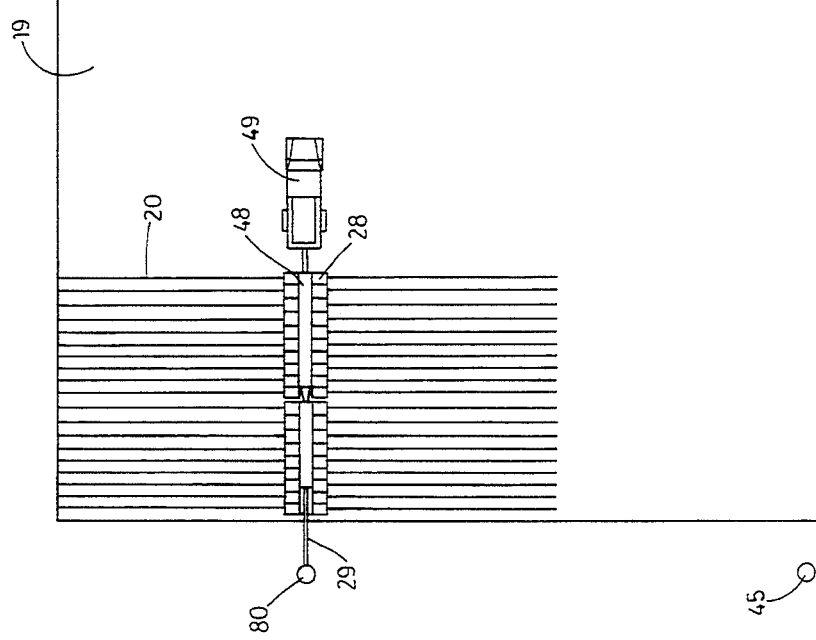

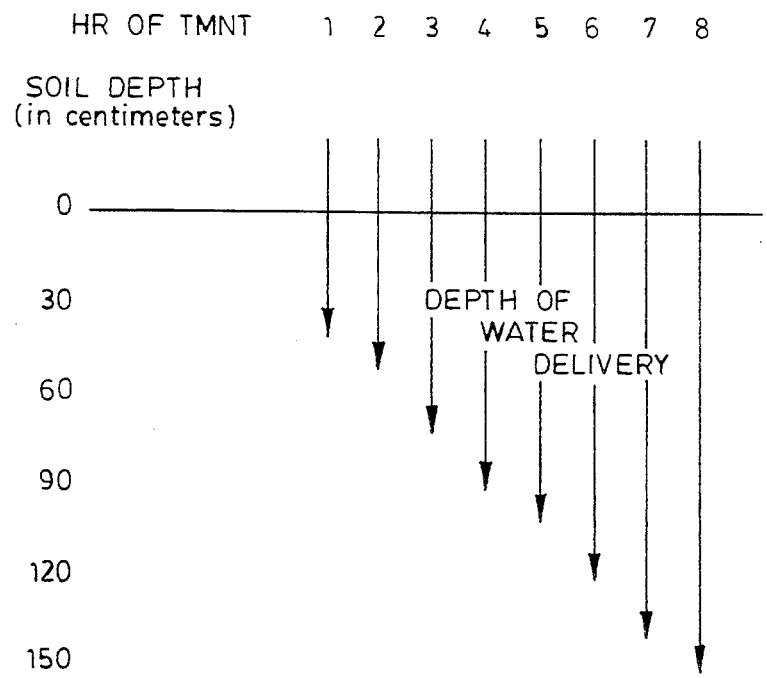
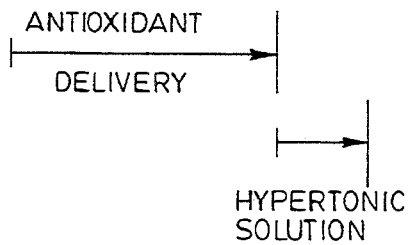
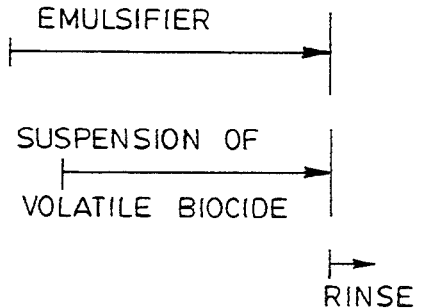
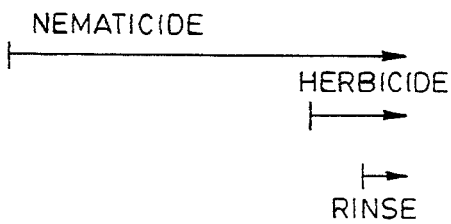
FIG. 11

PRE-PLANT SOIL TREATMENT METHOD AND APPARATUS

BACKGROUND OF THE INVENTION

The present invention relates to a method and apparatus for treating soil before planting, and more particularly to a new portable device and process for drenching soil to free it from pest and disease agents including deep dwelling nematodes before planting.

In commercial agriculture, before the planting of a crop it is usually desirable to treat the soil in order to free it from pests and disease agents that might interfere with healthy plant growth and crop production. The most notorious of these pests include soil-borne fungi, bacteria, actinomycetes, weed seeds and nematodes.

In any given cropping system one or more soil pests will gradually build in population to the point where the population levels remaining from the previous crop will not permit healthy and proper development of any newly planted crop which is also susceptible to the same pest. It is for this reason that crop rotation is an important method of soil pest control. It is for this same reason that soil fumigation has permitted growers to replant quickly after removing a previous crop.

The pests of concern are varied. They can be the relatively shallow dwelling soil fungi or bacteria which cause seedling diseases, or nematodes which are more subtle but insidious in their effect. Many times the actual disease incitant is not clearly known or is a combination of several organisms. In some cases the pest is singularly important but only in certain soil types or at certain times of the year. In the case of high value crops or nursery crops which are to be sold pest and disease free, the grower can afford to spend time and effort to rid the soil of specific pests. Examples include root knot nematodes, virus-transmitting nematodes, seedling diseases caused by pythium or rhizoctonia fungi, streptomyces scabies which causes a pox or fusarium fungus which may only be controllable before planting. All of these examples, as well as weed seeds are susceptible to treatment with certain biocides (biocidal materials) if properly delivered to their location in soil.

In the past, several volatile chemicals such as 1,3-dichloropropene and methyl bromide were used in commercial agriculture for soil treatment purposes. As a result of increasing environmental regulation, the number of currently registered chemicals available for these purposes is being greatly diminished. Because methyl bromide is highly volatile, it is almost always applied under a "gas-tight" polyethylene sheet. The sheet is laid down over the entire field after a tractor injection of the methyl bromide into the soil. As a result, methyl bromide is very expensive to use; and, according to the Clean Air Act of 1992, it is scheduled to be completely banned from use in the U.S.A. by the year 2000 because it is a class I ozone depletor.

The agricultural industry is therefore presented with a serious dilemma. On the one hand, there is an ever increasing demand for more efficient food production from land that is dedicated to agricultural use. On the other hand, there is at the same time a demand for a reduction and/or elimination of the use of volatile and toxic chemicals in food production. It is therefore not only desirable but necessary that alternative pre-planting soil treatments and methods be developed.

SUMMARY OF THE INVENTION

The present invention meets these needs by providing a portable soil drenching apparatus and method employing any of a number of water soluble biocidal materials (biocides) for pre-plant soil treatment in order to eliminate pests and disease agents. The apparatus includes a series of hoses each having drip irrigation emitters in place thereon at spaced intervals. The hoses may be attached to the underside of a tarp or laid free on the field surface. Each hose is sealed at one end and attached at the other end to a manifold delivery system. The hoses are deployed onto the field which is to be treated, and the manifold is connected to a water supply and material mixing source. The selected materials are mixed with the water and introduced into the manifold system and hoses over a long period of time resulting in even distribution and drenching of the field.

There are a number of alternative materials that may be used in this new system, and several new methods of introduction. The selection of the material and the method used will ultimately depend upon the pest or disease element to be eliminated and the biocidal characteristics of the toxic agent(s). For each application, the soil profile must be developed into a moistened, near homogeneous condition which will permit uniform water infiltration. Then the appropriate biocidal materials are selected for elimination of the targeted pests or disease elements. Next, the biocidal materials are delivered through the system for a sufficient time period to obtain results at the desired depth. These materials may be delivered uniformly for the entire period, as a wave, or they may be stacked depending on their mode of action. Each of these three methods is discussed more fully below.

The apparatus of the present invention helps reduce the release of volatile materials into the environment and distributes them in the soil as desired. Many of the materials which may be used are generally not restricted, so that by virtue of the new application methods used in conjunction with the new apparatus, important agricultural pre-planting soil treatments may be effectively accomplished without the dangers or expense associated with restricted-use chemicals.

It is therefore a primary objective of the present invention to provide a portable apparatus and method providing effective pre-planting soil treatment which consistently eliminates pest and disease agents without the use of restricted chemicals.

It is a further primary objective of the present invention to provide a portable apparatus and method for effective pre-planting soil treatment which results in reduced volatilization of the biocidal agents from the field surface.

It is a further objective of the present invention to provide a portable apparatus and method for effective pre-planting soil treatment which provides the opportunity to apply non-conventional biocides having lower vapor pressures resulting in less volatilization.

It is a further objective of the present invention to provide a portable apparatus and method for effective pre-planting soil treatment which makes possible a wide selection of synthetic and naturally occurring biocides for use in eliminating pest and disease agents from soil.

It is a further objective of the present invention to provide a portable apparatus and method for effective pre-planting soil treatment which allows for the application of selected biocidal materials to a wide range of soils.

It is a further objective of the present invention to provide a portable apparatus and method for effective pre-planting soil treatment which is capable of delivering lethal dosages of biocidal materials to a depth of over five (5) feet.

It is a further objective of the present invention to provide a portable apparatus and method for pre-planting soil treatment which effectively eliminates nematodes.

It is a further objective of the present invention to provide a portable apparatus and method for effective pre-planting soil treatment which allows for pest-free certification of treatments because of their visible effect.

It is a further objective of the present invention to provide a portable apparatus and method for pre-planting soil treatment which provides a less expensive but reliable means of eliminating pest and disease agents from soil before planting.

It is a further objective of the present invention to provide a portable apparatus and method for effective pre-planting soil treatment which may accomplish delivery of biocidal materials deep into the soil with herbicides or fungicides nearer to the surface all as part of the same treatment.

It is a further objective of the present invention to provide a portable apparatus and method for effective pre-planting soil treatment which allows for the application of a concentrated wave of fast-killing biocidal materials to the soil in order to eliminate targeted pests or disease agents.

It is a further objective of the present invention to provide a portable apparatus and method for pre-planting soil treatment which allows for the scheduled introduction (stacking) of biocidal materials in a particular order which effectively eliminates targeted pests or disease agents.

It is a further objective of the present invention to provide a portable apparatus for pre-planting soil treatment which utilizes a series of hoses having drip irrigation emitters at selected intervals for introduction of water soluble materials onto a field.

It is a further objective of the present invention to provide a portable apparatus for pre-planting soil treatment which includes a series of drip irrigation hoses connected to a common manifold that may be temporarily deployed onto a field and attached to a water mixing supply for introduction of biocidal materials onto the field.

It is a further objective of the present invention to provide a portable apparatus for pre-planting soil treatment consisting of a series of drip irrigation hoses and manifolds which may be attached to an existing center-pivot irrigation system.

It is a further objective of the present invention to provide a portable apparatus for pre-planting soil treatment consisting of a series of drip irrigation hoses and manifolds which may be attached to an existing linear irrigation system.

It is a further objective of the present invention to provide a portable apparatus for pre-planting soil treatment consisting of a series of downwardly-pointing sprinklers which may be attached or added behind an existing center-pivot irrigation system.

It is a further objective of the present invention to provide a portable apparatus for pre-planting soil treatment consisting of a series of downwardly-pointing sprinklers which may be attached or added behind an existing linear irrigation system.

It is a further objective of the present invention to provide a portable apparatus and method for pre-planting soil treatment which reduces worker exposure to hazardous materials.

It is a further objective of the present invention to provide a portable apparatus and method for pre-planting soil treatment which reduces the total volume of biocidal material required for a treatment in order to eliminate the targeted pests or disease agents.

It is a further objective of the present invention to provide a portable apparatus and method for pre-planting soil treatment which is extremely effective and applicable to a wide range of water soluble compounds and field situations.

Additional objectives of the invention will be apparent from the detailed descriptions and the claims herein.

BRIEF DESCRIPTION OF THE DRAWINGS

FIG. 3 is a perspective view of a field having an existing linear (wheel-line) irrigation system onto which the manifold and hoses apparatus of the present invention has been attached.

FIG. 4 is a side cutaway view along line 4—4 of FIG. 3 showing the cross section of a hose with a drip irrigation opening therein lying on the flat field surface.

FIG. 6A is a side cutaway view along line 6A—6A of FIG. 6 showing the cross section of a hose with a drip irrigation opening therein lying on the furrowed field surface.

FIG. 8A is a diagrammatic view of a set of tractor-drawn trailers having a set of large spools of unrollable hoses of the present invention mounted thereon for deploying hoses on either side of the trailer into a field.

FIG. 11 is a diagram (chart) depicting the scheduled introduction (stacking) method of introducing the biocidal materials through the system onto a field.

DETAILED DESCRIPTION OF THE DRAWINGS

Figure 1:
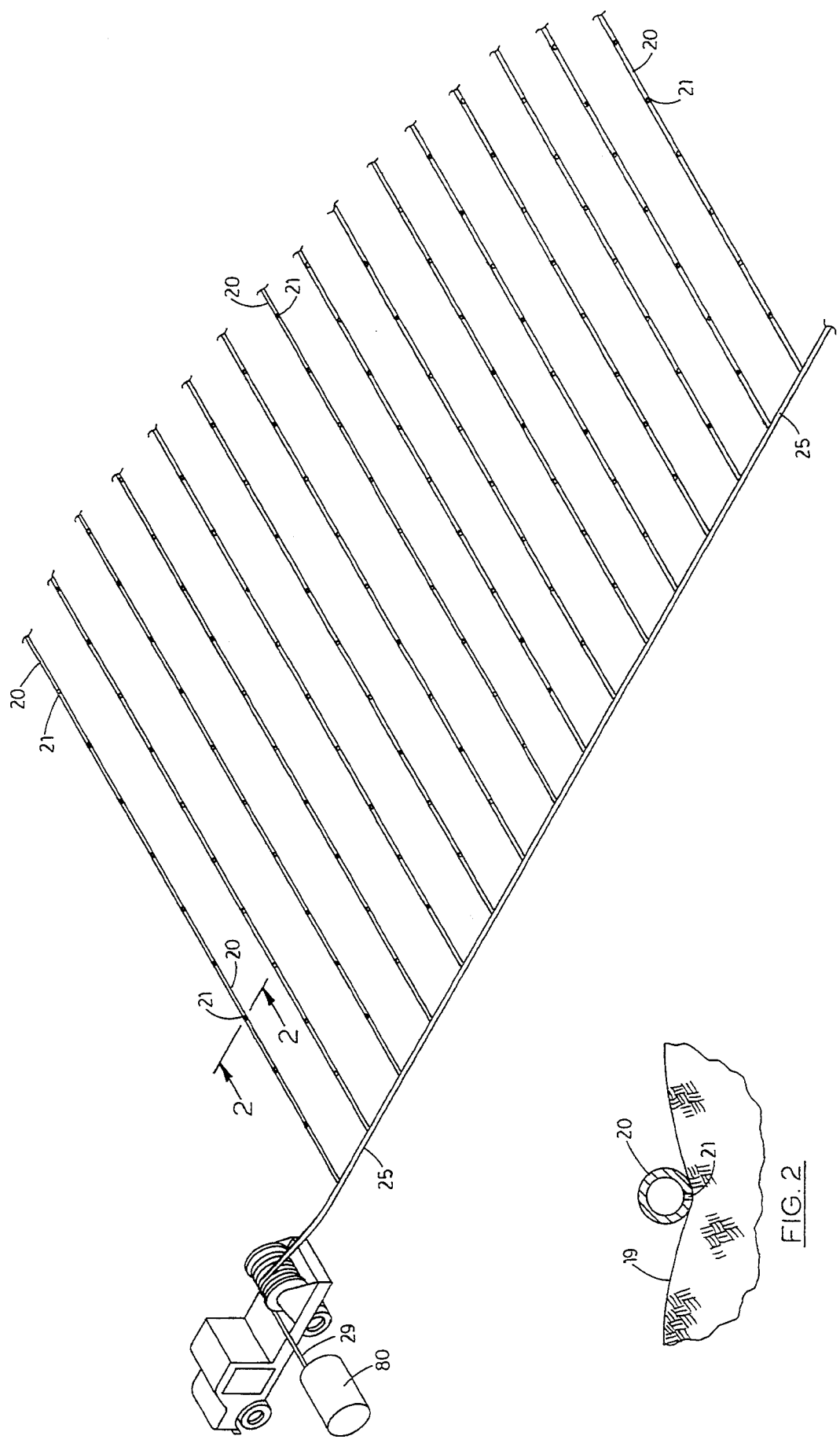
FIG. 1 is a perspective view of a relatively flat field onto which one embodiment of the present invention has been deployed. The embodiment shown is the portable spool with drip irrigation hoses connected to a manifold.

1. The Apparatus. Referring to the drawings wherein like reference characters designate like or corresponding parts throughout the several views, and referring particularly to FIGS. 1, 3, 5, 7 and 9, it is seen that the invention includes a series of hoses 20 each having drip irrigation openings (or emitters) 21 at spaced intervals thereon. Each hose 20 is closed at one end, and attached to manifold 25 at the other end. Manifold 25 is connected to a pump 80 supplying drenching solution through connector 29. The drenching solution is made at a pump 80 as depicted in FIG. 13 for introduction into the manifold 25 and hoses 20 of the system.

Figure 2:
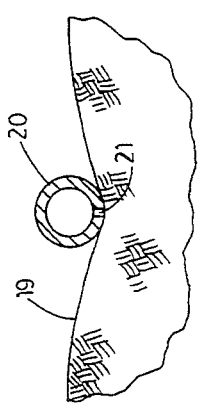
FIG. 2 is a side cutaway view along line 2—2 of FIG. 1 showing the cross section of a hose with a drip irrigation opening therein lying on a flat field surface.

In the detailed drawings of FIGS. 2 and 4, a typical cross section of a hose 20 deployed on the field surface 19 is shown. Openings 21 allow the mixture of water and biocidal materials to be slowly introduced into the soil over a long period of time.

The embodiment disclosed in FIG. 1 is completely transportable from field to field. The hoses 20 may be unrolled into the field in parallel lines, preferably on a flattened surface 19 (except for the center-pivot embodiment of FIG. 6). Manifold 25 is then unrolled along one end of the field for connection to hoses 20. The manifold 25 is then, in turn, connected by means 29 to the drenching solution supply pump 80. The appropriate biocidal materials and method of application are then selected (see method descriptions below).

Figure 9:
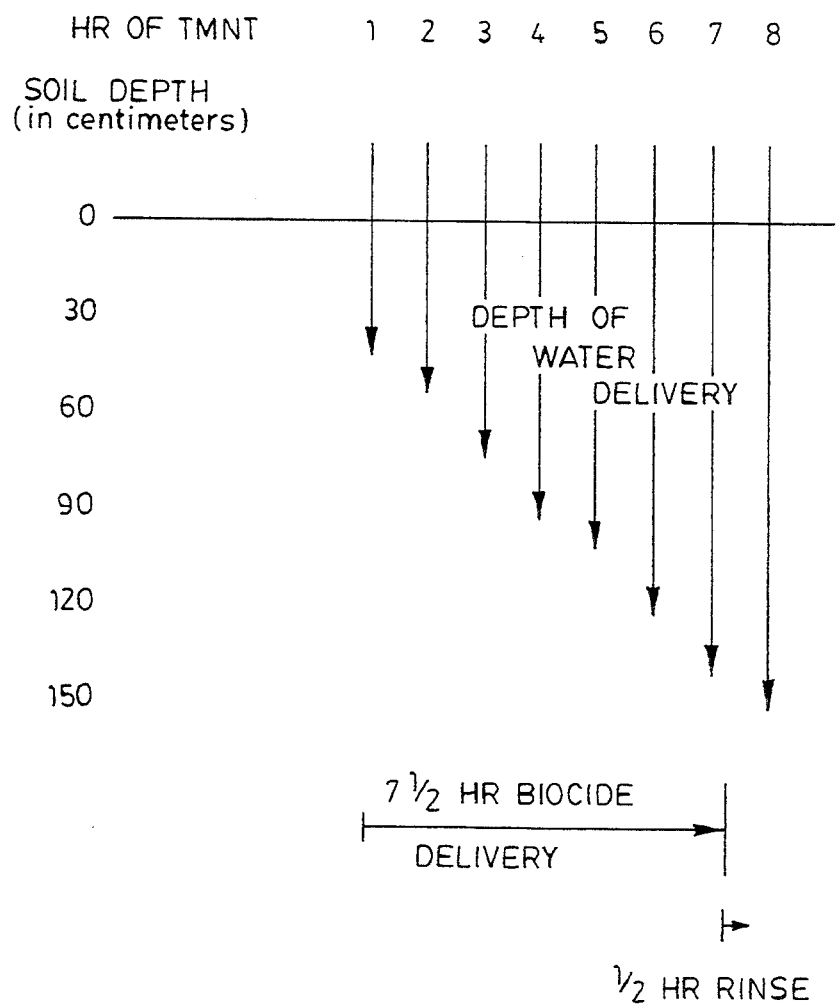
FIG. 9 is a diagram (chart) depicting the uniform method of introducing the biocidal materials through the system onto a field.
Figure 10:
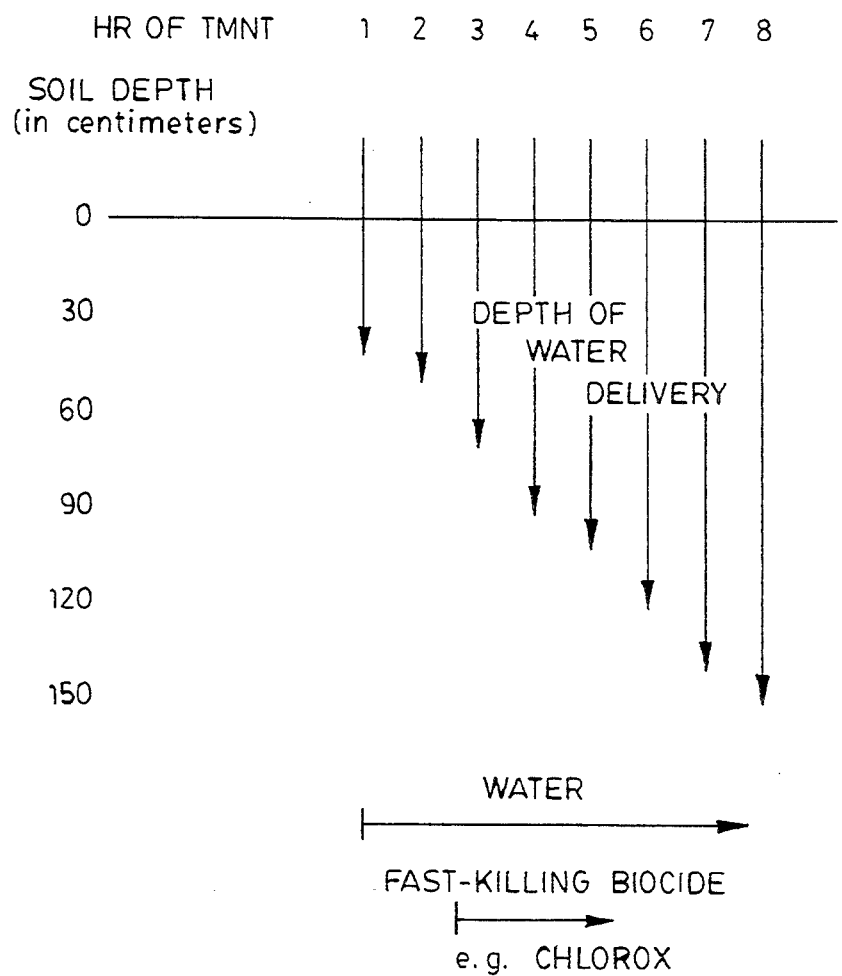
FIG. 10 is a diagram (chart) depicting the wave method of introducing the biocidal materials through the system onto a field.
Figure 12:
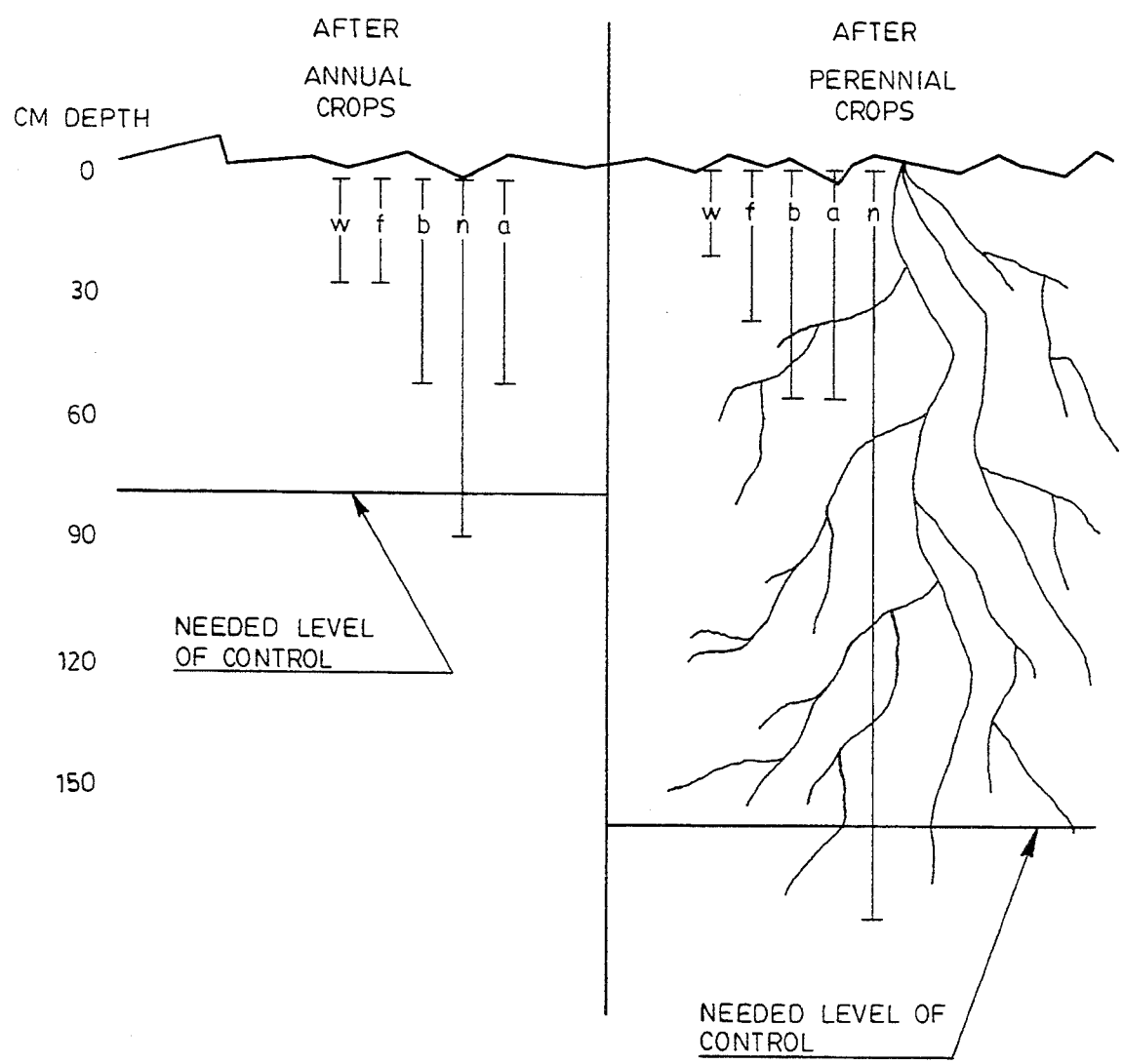
FIG. 12 is a side cutaway view of a field showing the depth of penetration and location of pests and disease after annual as contrasted to perennial crops (w=weed seeds; f=pathogenic fungi; b=pathogenic bacteria; n=pathogenic nematodes; a=actinomycetes).
Figure 13:
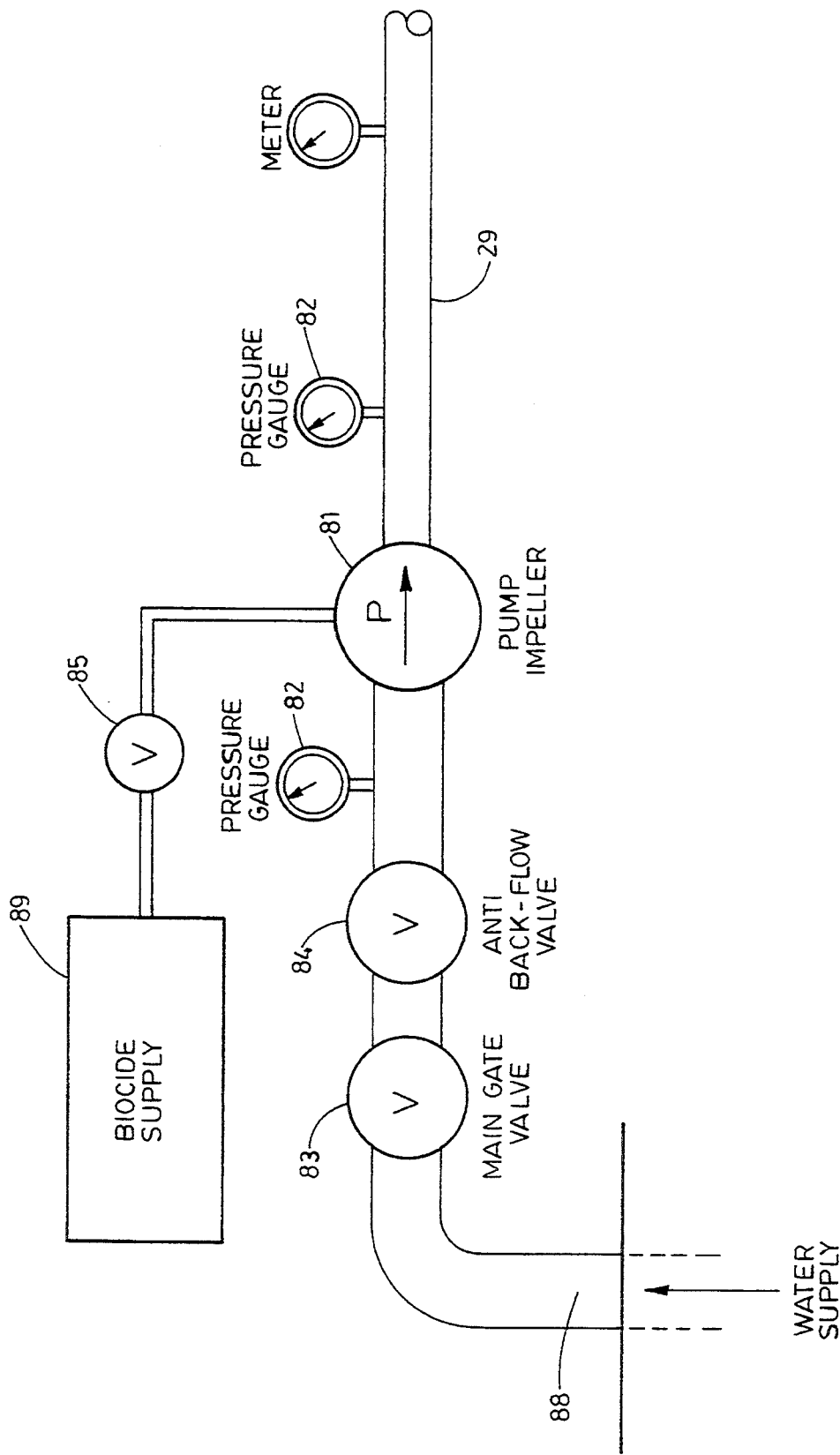
FIG. 13 is a schematic view showing a typical method of introduction of the biocidal material into the drenching solution.

The selected biocide materials 89 are added at the impeller 81 of the pump 80 (see FIG. 13). Control of the timing of the introduction of the materials 89 is accomplished using valve 85 (i.e. Valve 85 is left open for the entire uniform treatment period; valve 85 is opened for a limited period during a wave treatment; and valve 85 is closed and reopened between stacked applications of different materials. These methods are discussed in detail below). The pump should include a main gate valve 83 and an anti-backflow valve 84 to control the introduction of water to the pump, and to prevent the biocide from traveling back into the water supply 88 when the pump impeller 81 is turned off. The water supply 88 remains turned on for the desired period of time (e.g. 8 hours as shown in FIGS. 9, 10, and 11). Pressure gauges 82 allow for monitoring of the drenching to assure even application. The result is the slow but even drenching of the field 19 with the biocide 89 which eliminates the targeted pests and disease agents.

Figure 7:
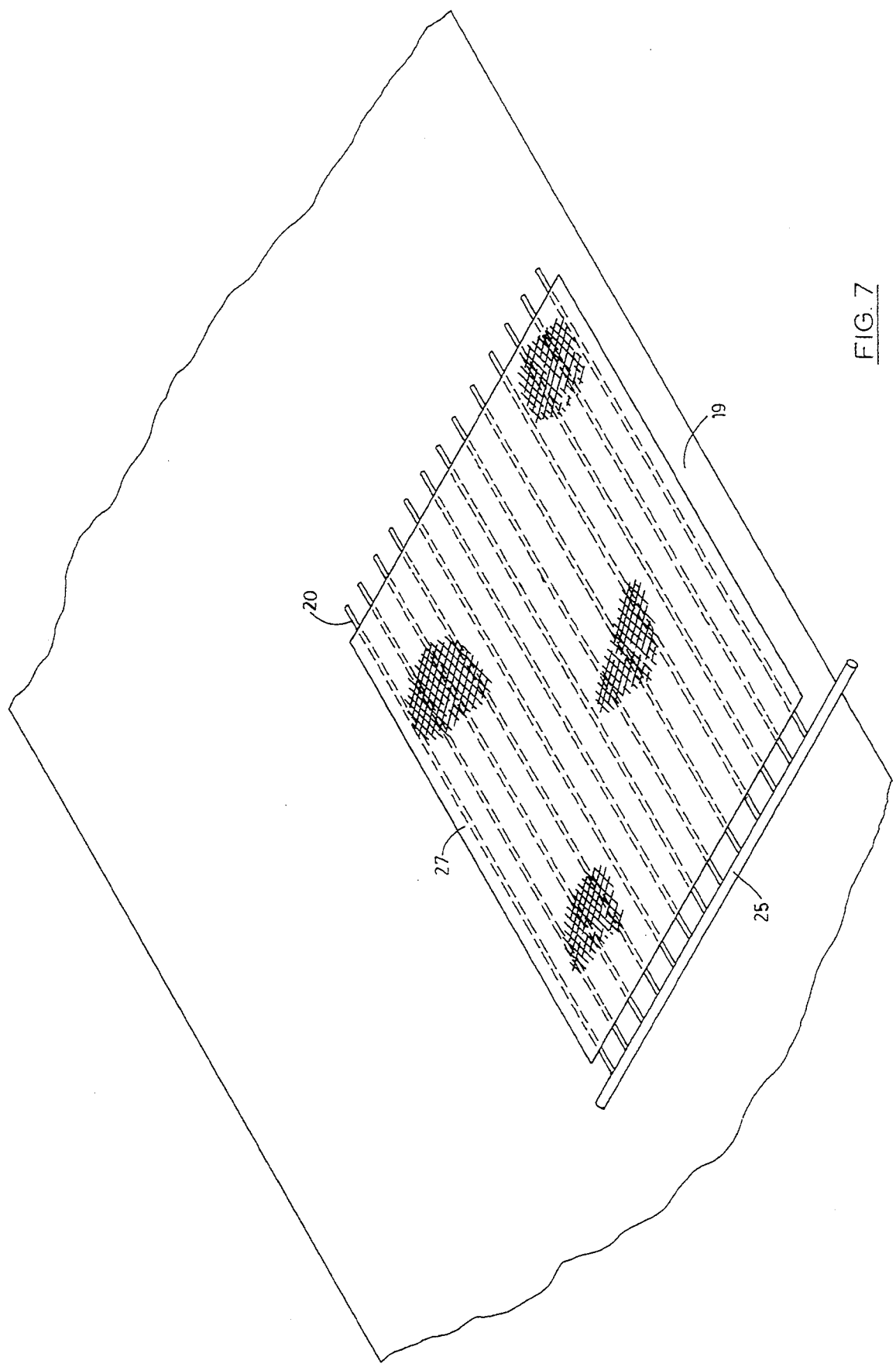
FIG. 7 is a perspective view of a field onto which an embodiment of the present invention using the portable tarpaulin with drip irrigation hoses connected to a manifold has been deployed.

A related embodiment is shown in FIG. 7 in which the hoses 20 having openings (or emitters) 21 therein are attached to the underside of a tarpaulin, netting or other similar foldable material 27. The spacing and location of the openings 21 are better controlled because of the attachment of the hoses 20 to the tarpaulin 27. The ends of the hoses are attached to manifold 25. The remainder of the operation of this related embodiment (FIG. 7) is the same as above (FIGS. 1 and 13).

The embodiment disclosed in FIG. 3 includes a similar series of hoses 20 having drip irrigation openings (or emitters) 21 therein attached to a long manifold 25 by connectors 38. In this embodiment, the manifold 25 is near the ground and is attached to the motorized wheel structures 33 at either end of the linear irrigation system by means 31 (e.g. chains). Connection to the overhead cross bar 34 is not recommended since the weight of the hoses 20 and manifold 25 could knock over the wheel structures 33. Hoses 20 are of a short enough length that they may be easily pulled by the motorized wheel structures 33. The hoses 20 are deployed parallel to each other, behind and perpendicular to the cross bar 34.

In certain wheel line linear irrigation systems, there are large wheels which resemble wagonwheels at spaced intervals instead of the motorized structures 33 shown in FIG. 3. In such wheel line systems, the attachment means 31 are connected directly to pipe 34 which acts as an axle. Such attachment means 31 must therefore be slidably attached in order to avoid the rotation of the wheel line pipe 34 from wrapping the hoses 20 around it.

Usually, the hoses 20 will not be long enough to cover the entire field so the drenching is done in stages. Manifold 25 is connected to pump 80 by means 29. As with each embodiment, the appropriate biocidal materials and method of application are selected, the materials 89 are added in at the impeller 81 of pump 80, and the water is left on for the desired period of time. When the drenching is completed, the motorized wheel structures 33 are moved to the next stage so that hoses 20 again cover an untreated portion of the field 19, and the treatment process is repeated. This staging is repeated until the entire field has been treated.

Figure 6:
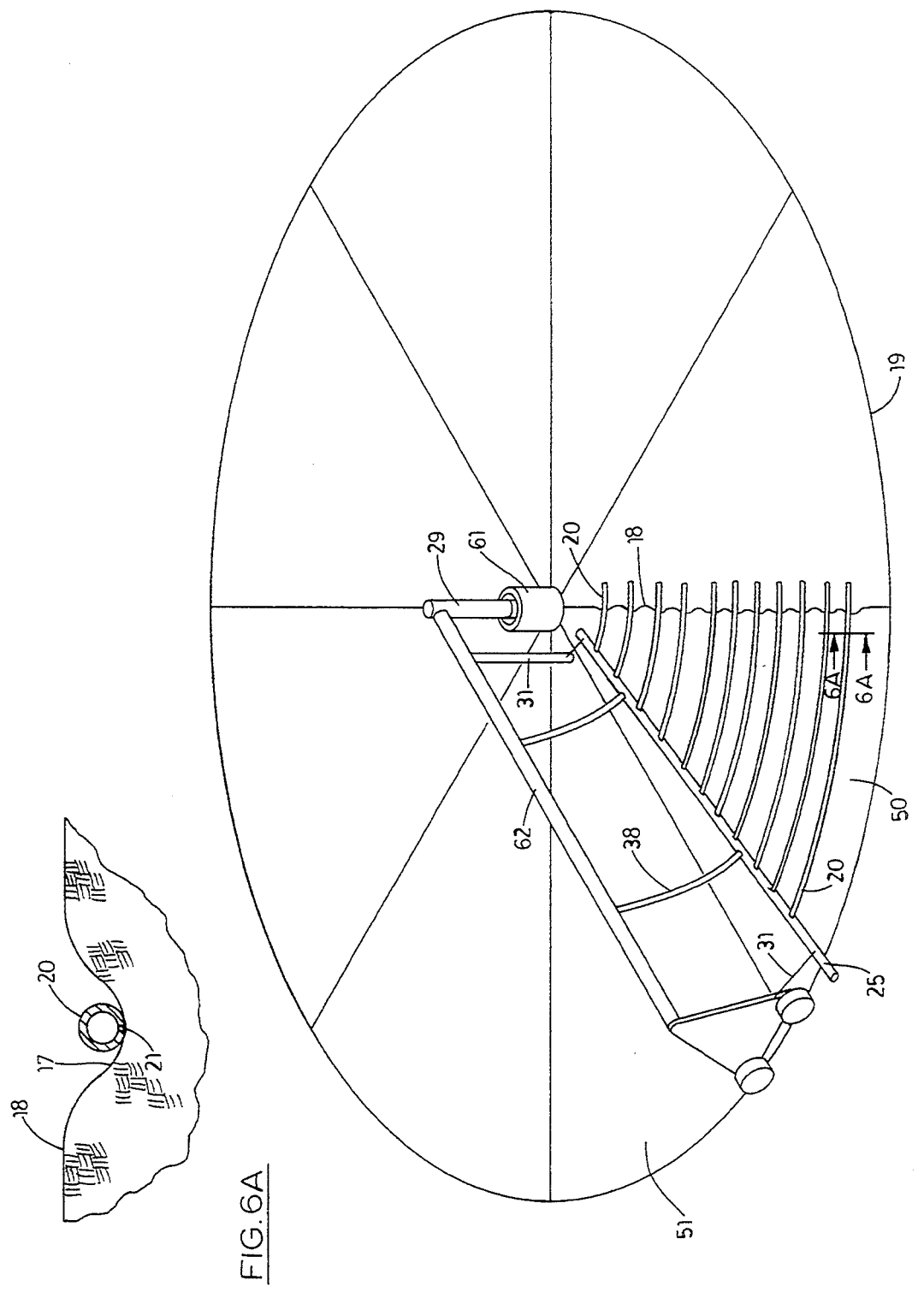
FIG. 6 is a perspective view of a field having an existing center-pivot irrigation system onto which the drip irrigation hoses and manifold embodiment of the present invention has been attached. In this example, furrows are needed to maintain the hoses a uniform distance apart.

The embodiment described in FIG. 6 is similar to that shown in FIG. 3 except that the irrigation system 62 to which the manifold 25 is attached is based on a center pivot 61. Hoses 20 having openings (or emitters) 21 therein are attached to manifold 25 near the ground. The manifold 25 is attached by means 31 to the center pivot system for movement, and is connected to the fluid supply by pipe means 38 in cross bar 62. The cross bar 62 is connected by means 29 to pump 80 (not shown, but see FIG. 13). The hoses 20 attached near the pivot 61 are shorter than those which are radially distant. This arrangement helps keep the hoses evenly and radially separated from each other, and allows for a pie-shaped portion 50 of the field 19 to be treated. Segments larger than one eighth ($\frac{1}{8}$) of the field cannot be easily treated since the rotational movement of system 62 tends to cause the outer hoses to collapse against the inner ones, unless furrows 17 are made around the circular field at the proper distances leaving elevated ridges 18 for the hoses 20 to follow (see FIG. 6A). Once the hoses 20 are in position, the previously described selection, mixing and application procedures are followed resulting in the treatment of a pie-shaped portion 50 of the circular area of the field 19 covered by the center-pivot system 62. Once that pie-shaped section 50 is treated, the pipes and hoses (62, 38, and 20) of the system are emptied of water to reduce their weight. They are then rotated forward over the next untreated section 51. The treatment process is then repeated, and so on, until the entire field 19 has been treated.

Figure 5:
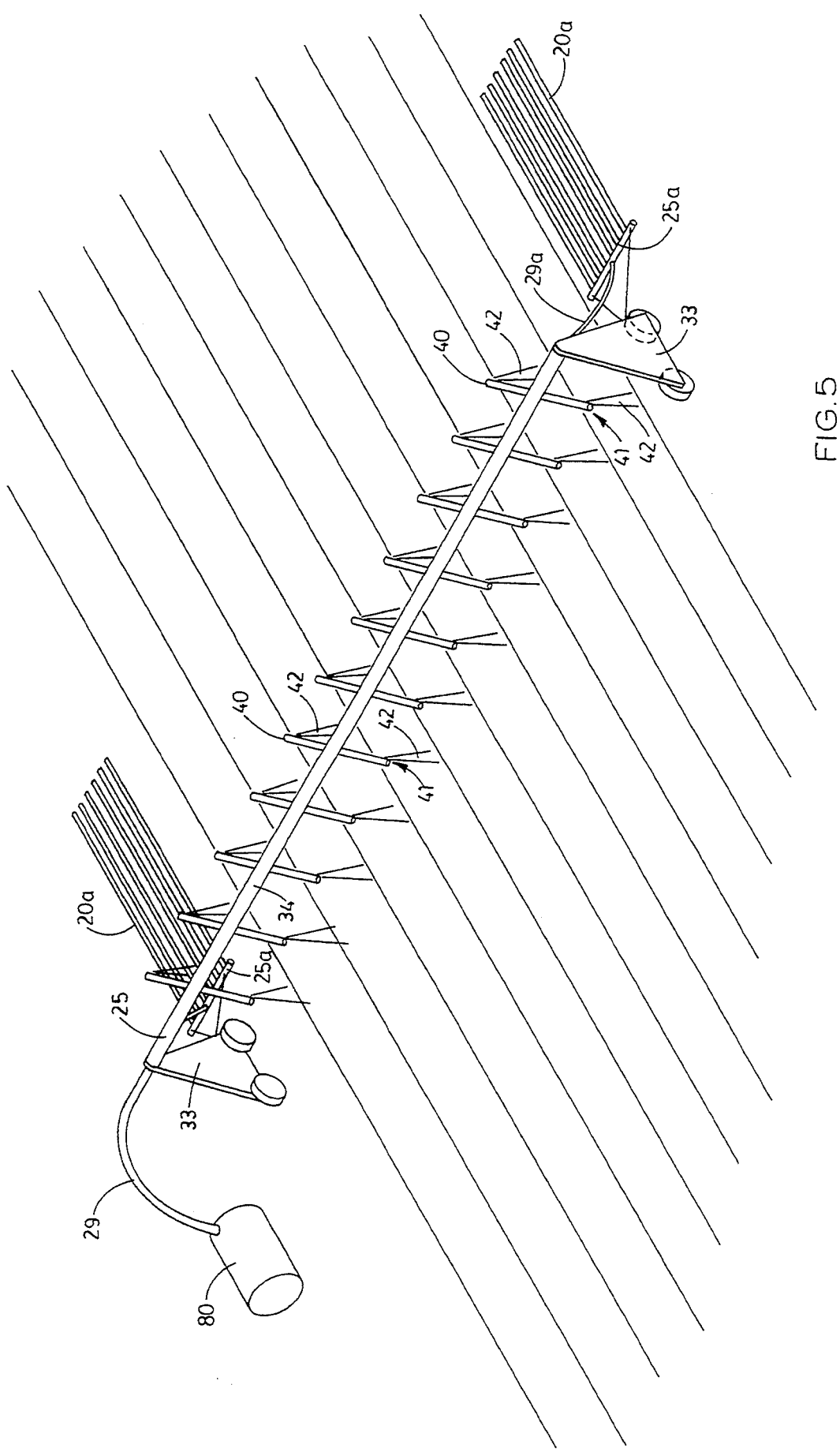
FIG. 5 is a perspective view of a field having an existing linear irrigation system onto which the sprinkler embodiment of the present invention has been attached with emitters approximately 24 inches above the field surface.

A sprinkler-based embodiment of the apparatus is described in FIG. 5 which shows the sprinkler system embodiment attached to a linear irrigation system. In this embodiment, a set of evenly-spaced low atomizing sprinkler heads 41 are attached to a series of brackets 40 which are, in turn, connected to a manifold 25 which connects back to the pump 80 in which water and biocidal materials are mixed. The sprinklers 41 are mounted underneath the cross-bar manifold 25 such that they spray downward 42 and are within two feet (2') of the ground. This embodiment allows a small strip of the field to be treated using the sprinklers. When complete, the wheel structures 33 are rotated forward and the process repeated until the entire field has been treated. In order to drench the area close to the wheel structures 33 themselves, short dripper hoses 20a of sufficient length are attached to small manifolds 25a and pulled behind the wheels. This prevents the wheels from being bogged down by soggy soil from the sprinklers. Minor adjustments in the attachment of the hoses 20a may be made to allow this embodiment to be used in wheel line irrigation systems as well.

Figure 8:
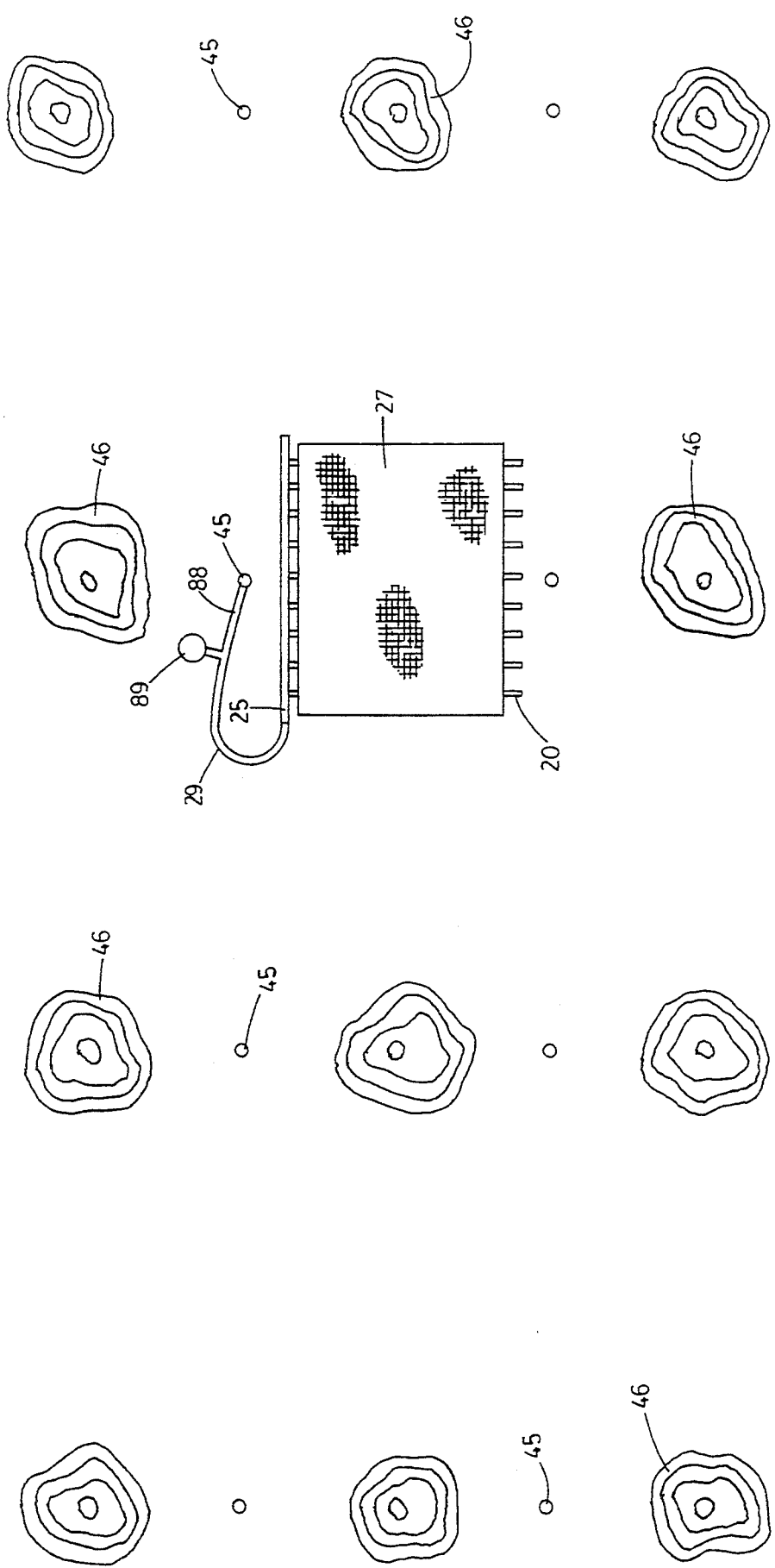
FIG. 8 is a schematic view showing placement of the portable tarpaulin embodiment of the present invention in use in a localized area where an orchard tree once was.

FIG. 8 discloses a method of attaching the apparatus to one or more existing solid set risers 45 as a water supply intended to cover a limited treatment area in an orchard of trees 46. Orchards, golf courses and other relatively permanent plantings are often provided with permanent irrigation systems 45. Frequently some portion less than the whole must be treated and replanted (e.g. a single tree, a single row of trees, a golfing green, or a designated area must be replaced). In these situations, either the tarpaulin version (FIG. 7) or the free standing version (FIG. 1) of the invention may be deployed over the limited area to be treated using a water source 45 from the existing irrigation system. This allows for a limited and selective pre-plant treatment without negatively affecting the existing permanent plantings.

FIG. 8A shows a top view of a large field 19 into which a tractor 49 pulling a series of trailers 48 has been deployed. Each of the trailers carries two sets of spools 28, one set down each side, onto which hoses 20 with openings 21 are unrollably wrapped. One or more trailers may be pulled onto the field, depending on the coverage desired and the amount of water available. The spools 28 are unrolled so that hoses 20 are deployed onto the field surface. The hoses 20 are connected by means 29 to a pump 80 with the same characteristics as shown in FIG. 13. This pump may be attached to the existing water supply 45. Once the treatment is completed, the hoses 20 are rolled up on spools 28. Then, tractor 49 pulls the trailers forward to the next untreated section of the field 19, the hoses 20 are unrolled again, and the process is repeated. These steps are repeated until the entire field has been treated.

The embodiments shown in FIGS. 3, 5, 6, 7 and 9 may be either stand-alone systems or portable system components (e.g. hoses 20, manifolds 25) that can be attached to existing linear (wheel line) or center-pivot irrigation systems. In many cases such irrigation systems will already be in place, and the grower desires to pre-treat the soil before rotating in a new crop variety. In such cases, the portable versions of the present invention (either hose-based or sprinkler-based) may simply be temporarily attached to the existing irrigation system in order to use the existing water supply, motors and other hardware of the system for the treatments. When finished, the invention components are removed and the existing system used for its original irrigation purposes.

2. Methods. There are three different methods for applying the biocidal materials to a given field using the present invention: uniform treatment, wave treatment and stacking. The portable soil drenching apparatus of the present invention opens up a wide potential list of biocidal agents which may be used. The decision about which agents to use and the rate of treatment will be dependent upon the pest presence, previous experiences, and preferences. The decision about the treatment area will be largely determined by the presence or absence of plant resistance to the main pests in the site to be planted. If resistance is available then the present invention is still useful for getting the plant root system off to a healthy start in replant sites. This can be more efficiently accomplished by treatment in strips or spots at the planting site and not over the full surface area of the field. Selection of the injection procedure is dependent on the mode of action of the biocidal agent.

a. Uniform Treatment Method. This method (see FIG. 9) involves applying a uniform mixture of water and biocidal materials through the system at the same rate and concentration for the entire (long) drenching period. This procedure is appropriate for biocides which liberate methyl isothiocyanate, ammonia, carbon bisulfide or other biocidal agents having a half-life of at least several days (or weeks). The objective is to introduce a small but adequate quantity of biocide within every drop of water delivered to the soil. FIG. 9 shows a biocide treatment for seven and one-half (7/$\frac{1}{2}$) hours followed by a one half ($\frac{1}{2}$) hour rinse with water. Over an eight hour period, six inches of water are delivered with the biocide to a depth of 150 centimeters.

b. Wave Treatment Method. This method (see FIG. 10) differs from the uniform method in that only water is used in the first pre-determined period (e.g. 2–3 hours) of drenching. Then, after the first pre-determined period, a high concentration of the biocidal agent (Chlorox, in FIG. 9) is delivered for a second pre-determined period (e.g. 90% concentration for the next 2–3 hours). Finally, a much smaller concentration of the biocidal agent is delivered for a third pre-determined period (e.g. 10% concentration for the last 2–3 hours). This method is appropriate for those biocides having a very fast kill rate such as chlorox, chlorine dioxide, acrolein and the like. These products can kill a pest within minutes of exposure (e.g. Chlorox kills nematodes at 0.2 ppm in 10 minutes).

c. Stacking Method. This method (see FIG. 10) allows for the use of two different biologically complimentary agents. For example, if the targeted pests are nematodes, then introduction of an antioxidant for the first two-thirds ($\frac{2}{3}$) of the drenching period, followed by the introduction of a hypertonic solution for the last one-third ($\frac{1}{3}$) can be effective (example 1 of FIG. 10). Certain crude water extracts of selected plants such as Marigold, California poppy, Cahaba White Vetch, Safflower and Sesame contain antioxidant effects. These extracts can be created by grinding up and mixing these plants and then filtering into a water solution. Nematodes bathed in small amounts of these crude water extracts receive a narcotic effect within an hour of exposure. Narcotized nematodes are unable to adjust if their environmental conditions change. For example, in the presence of hypertonic solutions (sugars or salts) the nematode must osmo-reglate to survive. A narcotized nematode is unable to do so. Thus, scheduling (stacking) the introduction of materials into the system for pre-determined period of time can have the proper effect of eliminating the undesired pests.

Another example of stacking involves the use of urea, an ammonia liberator. Urea produces a urea phytotoxicity in plants seeded too soon after an application. By making a uniform urea treatment but also adding a carbon source to the surface 1-ft. of soil (by introducing sugar or plant extracts during the last hour of drenching) the problems of urea phytotoxicity can be more quickly reduced.

DESCRIPTION OF THE PREFERRED EMBODIMENTS

In the preferred embodiment, the apparatus of the present invention is comprised of a series of hoses 20 each having drip irrigation emitters 21 delivering approximately 0.4 gal/hr and spaced therein at twelve inch (12") intervals. A spool 28 contains ten (10) hoses 20 each approximately five hundred feet (500') in length which are closed at one end and attached to a manifold 25 at the other end. The hoses are unrolled onto the field 19 and may be already connected to the manifold. This process is repeated nine (9) times so that a total of 90 hoses are deployed (enough to cover approximately one acre). The several manifolds are connected into a common pipe 29 which is connected to the water pump 80. The pump should have an anti-back flow device 84 and sieving screens attached for collecting and mixing the biocide(s) 89 through a gallonage meter 87. Once water has been flowing enough to check for leaks and establish adequate pressure (30 minutes or so) the biocide is slowly added to the water at the pump impeller 81 or at a venturi device elsewhere in the line according to the method selected.

The preferred method of drenching is the uniform application of biocidal materials at constant concentrations for a pre-determined period of time. After the time period has run, the hoses are rolled up and moved to the next area to be treated, and the process is repeated. For sprinkler use, it is preferred that the sprinkler heads be aimed downward and be no farther than two feet (2') from the field surface.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. A method for treating an identified area of soil before planting comprising the steps of:
   a. developing the soil profile for the area into a moistened, near-homogenous condition;
   b. utilizing a portable soil drenching device that is comprised of:
      1. a plurality of conduit lines removably deployable onto a field each line having a plurality of drip irrigation emitters attached thereto at regularly spaced intervals wherein one end of each line is closed;
      2. a manifold for connection between the open ends of said conduit lines and a water source;
      3. a means for attaching said manifold to an existing linear irrigation system to allow said manifold and hoses to be pulled by said system; and
      4. a means for mixing said biocidal materials with water at said water source for introduction into said device;
   c. selecting the appropriate biocidal material for the targeted pest in the area;
   d. selecting the appropriate treatment rate and delivery time for the targeted pest and area to be treated; and
   e. selecting the method of introduction of the biocidal material into the area.

2. A method for treating an identified area of soil before planting comprising the steps of:
   a. developing the soil profile for the area into a moistened, near-homogenous condition;
   b. utilizing a portable soil drenching device that is comprised of:
      1. a plurality of conduit lines of different lengths removably deploy able onto a field, each line having a plurality of drip irrigation emitters attached thereto at regularly spaced intervals wherein one end of each line is closed;
      2. a manifold for connection between the open ends of said conduit lines and a water source;
      3. a means for attaching said manifold to an existing center-pivot irrigation system to allow said manifold and hoses to be pulled by said system; and
      4. a means for mixing said biocidal materials with water at said water source for introduction into said device;
   c. selecting the appropriate biocidal material for the targeted pest in the area;
   d. selecting the appropriate treatment rate and delivery time for the targeted pest and area to be treated; and
   e. selecting the method of introduction of the biocidal material into the area.

3. The invention described in claim 2 wherein the shortest line is closest to the center pivot, the longest line is radially farthest from the center pivot, and the lines in between are of gradually varying length from shortest to longest.

4. A method for eliminating undesired pests and disease agents from soil before planting comprising the steps of creating a mixture of water and biocidal material, and delivering water to the soil through an irrigation apparatus over a first pre-determined period of time, then delivering a high concentration of the mixture through the apparatus for a second pre-determined period of time, and finally delivering a low concentration of the mixture through the apparatus for a third pre-determined period of time.

* * * * *